United States Patent [19]

Bamforth et al.

[11] Patent Number: 4,880,643

[45] Date of Patent: Nov. 14, 1989

[54] BEER AND OTHER BEVERAGES AND THEIR MANUFACTURE

[75] Inventors: Charles W. Bamforth, Staffordshire; Roy Cope, West Midlands, both of England

[73] Assignee: Bass Public Limited Company, Burton-on-Trent, United Kingdom

[21] Appl. No.: 81,570

[22] Filed: Aug. 4, 1987

Related U.S. Application Data

[63] Continuation-in-part of Ser. No. 644,912, Aug. 27, 1984, abandoned.

[30] Foreign Application Priority Data

Sep. 3, 1983 [GB] United Kingdom ................. 8323686
Apr. 18, 1984 [GB] United Kingdom ................. 8410142

[51] Int. Cl.$^4$ .............................................. C12C 5/02
[52] U.S. Cl. ................................................. 426/16
[58] Field of Search ...................................... 426/16

[56] References Cited

U.S. PATENT DOCUMENTS

| | | | |
|---|---|---|---|
| 1,673,275 | 6/1928 | Wallerstein | 426/16 |
| 2,472,252 | 6/1949 | Hughes | 426/330.4 |
| 3,970,520 | 7/1976 | Feldman | 195/29 |

FOREIGN PATENT DOCUMENTS

| | | |
|---|---|---|
| 0463932 | 4/1946 | Belgium . |
| 0400471 | 7/1909 | France . |
| 0801612 | 9/1958 | United Kingdom . |
| 0875596 | 8/1961 | United Kingdom . |
| 0964484 | 7/1964 | United Kingdom . |
| 1474807 | 5/1977 | United Kingdom . |
| 2001341 | 1/1979 | United Kingdom . |

*Primary Examiner*—Jeanette Hunter
*Attorney, Agent, or Firm*—Oldham & Oldham Co.

[57] ABSTRACT

Proteinaceous material is added to beer or other beverages. In beer and those other beverages on which a head can be formed it helps to improve the head, while in beverages not normally forming a head it can enable a head to be formed. Proteins extracted from albumen may be employed or whole albumen may be used. To avoid any tendency to haze-formation, particularly on pasteurization, protein fragments may be used. These can be formed by hydrolyzing proteins such as albumen proteins. An alternative method is to use alkylated proteins. Alkylated protein fragments are particularly satisfactory. The alkyl radicals may contain from four to twenty carbon atoms, preferred radicals containing six carbon atoms.

7 Claims, No Drawings

BEER AND OTHER BEVERAGES AND THEIR MANUFACTURE

This application is a continuation-in-part of 644,912 filed Aug. 27, 1984, now abandoned.

This invention relates to beer and other beverages and to their manufacture. In particular the invention is concerned with the incorporation into a beverage of an additive enabling the beverage to have a head formed on it or to improve the quality of the head that can be formed on it.

The invention is primarily applicable to beer, and the term beer is used herein to designate generally any of a variety of alcoholic beverages made by the fermentation of hopped malt wort; it thus includes within its scope ales, lagers and stouts. Beer itself is normally dispensed with a head, but there are also other beer-like beverages that are normally dispensed with a head and to which the invention is also particularly applicable, these including beverages which include little or no alcohol but otherwise resemble beer quite closely.

In addition to such beer-like beverages the invention may be applied both to other beverages which are customarily dispensed with a head and to beverages which have not hitherto been customarily dispensed with a head. These latter beverages may include wines, 'made wines', fortified wines and spirits. The invention is particularly applicable to carbonated beverages, both alcoholic and non-alcoholic, as the release of gas which tends to occur as the beverage is dispensed encourages a tendency to head-formation.

The foam or head that is normally present on a glass of beer is an important feature of the beer, and it has been found that many consumers, when judging the quality of a beer, consider that for a beer to have a head of good quality is one of the most important factors in that beer's favour. Much the same is also true of other beverages on which a head is formed. It is considered that a head is of good quality if it has a number of attributes, among which are stability, the ability to form 'lacing', that is a lace-like pattern of bubbles left on the side of the glass after the liquid beer or other beverage has been wholly or largely consumed, and a good appearance, that is a good colour (usually a white colour) and a preponderance of small bubbles of substantially uniform size.

The nature of the head on a glass of beer or other beverage depends principally on two factors, one being the constitution or composition of the beverage itself and the other being the way in which the beverage is dispensed. At least insafar as its application to beer is concerned, the present invention is primarily concerned with the former of those factors.

From a first aspect the present invention consists in a method of modifying or improving beer or other beverage, which method comprises the step of incorporating in the beverage concerned an additive enabling the beverage to have a head formed on it or to improve the quality of the head that can be formed on it, the additive comprising proteinaceous material.

The amount of additive required to improve the beverage can readily be determined by experiment. The characteristics of the head which tend to be particularly improved by the addition of the additive are the stability of the head, the whiteness of the head and the ability to form lacing. If the proportion of the additive in the beverage is further increased the beverage may become such that a head formed on it becomes excessively stiff, firm and stable.

The proteinaceous material of the additive may comprise at least one protein.

The chemical and physical analysis of beer has shown that certain constituents have a profound effect on the type of head that can be formed on beer, and in particular has shown that the presence of certain types of proteins, particularly those that are hydrophobic and are of a relatively large size, can lead to the formation of an improved head. It would be possible to improve the head-forming properties of beer by extracting suitable proteins from barley or malt and adding them to the ingredients normally used during the manufacture of the beer in order that the resultant beer should contain an increased proportion of the proteins concerned. Such a process of extraction and addition would, however, be relatively complicated and expensive and would therefore be unlikely to be commercially practicable.

It is therefore preferred to use an additive in which the protein or each protein is of a kind not otherwise present in the beverage concerned. The additive preferably comprises albumen, i.e. white of egg. Albumen, of a quality and purity suitable for its incorporation in foodstuffs, is a commercially available product that is relatively inexpensive and can be used, without further treatment, in carrying out the present invention. Nevertheless, commercially available albumen usually if not always contains some materials that are insoluble in water, and it is preferred to extract those before the remaining material, or part of the remaining material, is incorporated in the beverage. The insoluble components can be removed by filtration or by a process in which the albumen is centrifuged.

The additive is preferably formed as an aqueous solution, and that solution may also contain a minor addition of ethyl alcohol.

Experiments have shown that when using an additive comprising filtered albumen a satisfactory improvement in the head on beer can often be obtained by adding to the beer an amount such that the albumen content of the additive amounts to about 0.1 mg per 1.0 ml of beer. If the proportion of albumen is increased to abut 0.5 mg or 0.6 mg per 1.0 ml of beer the head that can be formed on the beer may be further improved. While the use of greater amounts of additive is considered by some to result in excessively stiff beers, others have found distinct advantages to result from the use of as much as about 1.0 mg per 1.0 ml of beer or even somewhat more.

Albumen includes a number of different water-soluble proteins, among which is ovalbumin. It is believed that ovalbumin plays a particularly important part in head formation and quality.

The way in which the additive operates is not fully understood, but it is believed that among other constituents albumen contains proteins that are hydrophobic, that are relatively large and that cause or assist in the improvement of the head. Moreover it is clear that albumen either contains no constituents that militate against the formation of a head of high quality or contains such constituents only in such small quantities that their effect is outweighed by the advantageous constituents, and particularly the proteins that are present.

It will be appreciated from the foregoing that the addition of a filtered, aqueous solution of albumen is probably the simplest and most economical way of carrying out the present invention; it will nevertheless be understood that it is within the scope of the invention to use as an additive only selected constituents from albumen, those consisting of or at least including the proteins that are effective in modifying or improving a beverage in the manner described.

The addition to beer of albumen or protein material extracted from albumen is effective in improving the head that can be formed on beer when it is dispensed, but can give rise to haze in the beer, particularly when the beer is pasteurised. In fact it is generally found that the addition of proteins to beer tends to reduce the brightness of the beer or to induce visible haze in the beer. Moreover it is thought that when the beer is heated during pasteurisation there is some tendency for chemical reactions to occur, probably including polymerisation, which increase the tendency to haze-formation in the beer. This effect is not limited to albumen proteins but seems to occur generally with added protein material. In fact the improvement of head-formation and head-quality by the addition of protein material seems to be directly proportional to the increase in haze-formation. Likewise the addition of albumen or other protein material to beverages other than beer appears to have similar consequences.

Nevertheless, the use of proteins is undoubtedly valuable for the improvement of the head on beverages, particularly in the case of beers, such as cask-conditioned beers, that are not pasteurised.

The present invention also provides protein-based additives for beer and other beverages which are effective but which tend to give rise to less haze-formation than occurs when unaltered proteins are used.

Thus a preferred additive comprises protein fragments of a chain-length shorter than that of the protein material from which they were derived.

The protein fragments are preferably made by the partial hydrolysis of protein material, the partial hydrolysis preferably being carried out with the aid of a proteolytic enzyme such as pepsin.

Partial hydrolysis of the protein material can yield protein fragments large enough to improve the quality of the head, particularly the stability of the head, without giving rise to any noticeable or unacceptable increase in haze, even on pasteurisation. The extent of the hydrolysis necessary to achieve such a result can readily be determined by experiment. It is likely that partial hydrolysis will yield a mixture which contains protein material that has not been hydrolysed and/or protein fragments that remain so long as to tend to lead to haze-formation. It is therefore preferred to separate at least some of such unhydrolysed protein material and/or excessively long protein fragments from the mixture before use. This is preferably effected by centrifuging the mixture and discarding the precipitate.

Another preferred form of additive, which is effective but which also tends to give rise to a reduction in haze-formation comprises alkylated proteinaceous material. The additive may comprise at least one alkylated protein, that is a complete protein chain that has been alkylated. However, the two concepts outlined above may be combined, so that a preferred additive comprises protein fragments which have a chain-length shorter than that of the protein material from which they were derived and which have been alkylated.

When the additive used comprises fragments of protein material formed by partial hydrolysis, the fragments are preferably separated from any remaining unsevered protein material before use. When the protein fragments are alkylated, alkylation is preferably carried out after the hydrolysis of the protein material and is preferably carried out after it has been separated from any remaining unsevered protein material. Alkylation may be effected in any suitable manner; for example the protein material or protein fragments may be treated with an alkyl acid anhydride. The alkyl radical preferably contains between four and twenty carbon atoms; a preferred alkyl radical has six carbon atoms.

In the manufacture of beverages that are not fermented the additive may be added at any desired stage of the manufacture. Likewise, in the manufacture of fermented beverages such as beer the additive may be added at any desired stage; nevertheless it is found that proteinaceous material tends to be destroyed or removed at various stages during manufacture, so it is preferred to add the additive at a relatively late stage. In particular, proteinaceous material tends to be destroyed during fermentation, so it is preferred to add the additive later than the fermentation stage. In addition there is a tendency for proteinaceous material to become concentrated in any froth that may be formed during manufacture and for it to be lost when such froth is discharged. Proteinaceous material may also be lost in any precipitates that may occur during manufacture. Therefore the additive may conveniently be added at a conditioning stage or at a brightening stage, but is preferably added before a pasteurisation stage.

As far as beer and beer-like beverages are concerned, the wort from which they are made usually contains quantities of proteinaceous material that would be quite sufficient for the formation of a head of good quality on the beverage if that material remained present in the same concentration throughout the manufacturing process. As explained above, however, it is normal for a significant proportion of the material to be lost at later stages in the process. The present invention, therefore, in adding proteinaceous material, can be thought of as restoring the lost material or as providing in place of the lost material a proteinaceous material of a kind which is closely related to the lost material. Thus additives of the kind outlined above differ markedly from other additives that have hitherto been proposed or used in an attempt to improve the head-forming properties of beer.

From a second aspect the present invention consists in a proteinaceous additive for use in carrying out a method in accordance with the first aspect of the present invention.

From a third aspect the present invention consists in beer or another beverage modified or improved by a method in accordance with the first aspect of the present invention.

The invention will now be illustrated by the following Examples.

EXAMPLE I

An aqueous extract is formed from commercially available dried albumen of an edible grade, by making a solution of the albumen in water containing 4% by weight of ethyl alcohol and then filtering the liquid to remove any insoluble components. A controlled amount of the additive is added to beer that has been brewed by a conventional brewing process and is at the conditioning stage, the additive being fed into the beer in the conditioning tank. The amount of additive is such that the albumen content of the additive amounts to 0.1 mg per 1.0 ml of beer. The beer modified or improved by the addition of the additive is bottled or racked in kegs. When the beer is ultimately dispensed, it is found that the head on the beer is improved in the manner described above.

EXAMPLE II

An aqueous solution of dried egg white is acidified so as to have a pH of 1.5. This is treated with pepsin for 20 hours at 50° C. The solution is then rendered less acid so that it has a pH of 6.5. The mixture is heated to 90° C. for 10 minutes. The mixture is then cooled and is centrifuged. Unhydrolysed protein forms a precipitate and is removed. The supernatant liquid is lyophilized and the resulting solids, being protein fragments, are suspended in dimethylsulphoxide. They are then treated with hexanoic anhydride so that the hexyl radicals become attached to the protein chains. After about 20 minutes the mixture is poured into water and the solution may either be used directly or be dialysed before use as an additive for beer.

When the additive is incorporated in beer it imparts stability to the foam without causing any noticeable increase in haze. The additive is preferably added to the beer during a late stage in production but before pasteurisation.

The mode of operation of the additive is not fully understood, but it is believed that the addition of alkyl radicals to the protein material or fragments of such material reduces the solubility of the additive and tends to cause the additive to become concentrated at the surface of the beer and therefore to affect the physical properties of the head.

While the additive described above incorporates hexyl radicals it is to be understood that other alkyl radicals may be employed, such as radicals having, for example, twelve, fourteen or sixteen carbon atoms.

EXAMPLE III

An aqueous solution of dried egg white is acidified so as to have a pH of 1.5. This is treated with pepsin for 30 minutes at 50° C. The solution is then taken to a pH of 6.5 and is heated to 65° C. for 60 minutes. The mixture is then cooled and is centrifuged and filtered. The resultant clear liquid is used as an additive for beer and has the effect of modifying or improving the head that can be formed as the beer.

Additives described above as being made by the methods described in any of the foregoing Examples may also be used as additives for beverages other than beer, that is for beverages of the kind on which a head is normally formed when the beverage is dispensed and also for beverages of the kind on which a head has not hitherto normally been formed.

We claim:

1. A method of improving the head of an beverage made by the fermentation of hopped malt wort without creating objectionable haze therein by steps comprising:
   forming a proteinaceous additive separately from the beverage by hydrolyzing albumen so that the molecular chains of at least some of the protein molecules in the albumen are shortened, and
   subsequently adding an effective amount of the hydrolyzed albumen to said beverage.

2. A method according to claim 1 in which the hydrolysis is effected by treatment of the albumen with pepsin.

3. A method according to claim 1 wherein the shortened chains are substantially separated from the unshortened chains before the incorporation of said shortened chains into said beverage.

4. A method according to claim 1 in which said beverage is beer.

5. A method according to claim 4 in which said shortened chains are incorporated into said beer subsequent to the fermentation stage.

6. A method according to claim 4 in which the amount of shortened chains incorporated is from about 0.1 mg to about 1.0 mg per ml of beer.

7. A method according to claim 1 in which the additive is at least substantially free from unhydrolyzed albumen.

* * * * *